(12) United States Patent
Pan et al.

(10) Patent No.: US 6,480,908 B1
(45) Date of Patent: Nov. 12, 2002

(54) CODEC SYSTEM WITH SHADOW BUFFERS AND METHOD OF PERFORMING A POWER DOWN/SUSPEND OPERATION ON THIS CODEC SYSTEM

(75) Inventors: Benjamin Ym Pan, Taipei Hsien (TW); Yung-Hui Chen, Taipei (TW); Chia hui Han, Taipei Hsien (TW)

(73) Assignee: Via Technologies, Inc., Taipei Hsien (TW)

( * ) Notice: Subject to any disclaimer, the term of this patent is extended or adjusted under 35 U.S.C. 154(b) by 0 days.

(21) Appl. No.: 09/434,862

(22) Filed: Nov. 4, 1999

(30) Foreign Application Priority Data

Jul. 8, 1999 (TW) .......................................... 88111570

(51) Int. Cl.⁷ ................................................ G06F 3/00
(52) U.S. Cl. ............................ 710/19; 710/5; 710/52; 348/416
(58) Field of Search ........................ 710/1, 8, 14, 5, 710/15, 19, 38, 65, 67, 52, 55; 345/202; 341/50; 713/310, 323; 348/415, 416

(56) References Cited

U.S. PATENT DOCUMENTS

| | | | | |
|---|---|---|---|---|
| 5,619,252 A | * | 4/1997 | Nakano | 348/14 |
| 5,703,651 A | * | 12/1997 | Kim et al. | 348/416 |
| 5,883,670 A | * | 3/1999 | Sporer et al. | 348/384 |
| 6,035,349 A | * | 3/2000 | Ha et al. | 710/68 |
| 6,195,766 B1 | * | 2/2001 | Maxwell et al. | 714/38 |
| 6,259,957 B1 | * | 7/2001 | Alexander et al. | 700/94 |
| 6,389,033 B1 | * | 5/2002 | Maxwell et al. | 370/438 |
| 6,418,203 B1 | * | 7/2002 | Marcie | 379/90.01 |

* cited by examiner

Primary Examiner—Jeffrey Gaffin
Assistant Examiner—Rijue Mai
(74) Attorney, Agent, or Firm—J.C. Patents

(57) ABSTRACT

Disclosed is a codec (coder/decoder) system with shadow buffers and method of performing a Power Down/Suspend mode operation on this codec system, which allows all the codecs in the codec system to know the operating status of each other so that system crash can be prevented during a power down/suspend operation. The codec system includes two or more codecs and associated codec controllers, with each codec controller including a status data buffer and a shadow buffer; and each codec controller utilizes the status data buffer therein for registering the operating status thereof and meanwhile utilizes the shadow buffer therein for storing a copy of the operating status data stored in the status data buffer of the other codec controller. The provision of the shallow buffers allows all the codecs in the codec system to be capable of knowing the operating status of each other. This feature can help prevent system crash during power down/suspend operation.

21 Claims, 4 Drawing Sheets

CODEC SYSTEM WITH SHADOW BUFFERS AND METHOD OF PERFORMING A POWER DOWN/SUSPEND OPERATION ON THIS CODEC SYSTEM

CROSS-REFERENCE TO RELATED APPLICATION

This application claims the priority benefit of Taiwan application serial no. 88111570, filed Jul. 8, 1999.

BACKGROUND OF THE INVENTION

1. Field of the Invention

This invention relates to computer system technology, and more particularly, to a codec (coder/decoder) system including two or more codecs, which allows all the codecs to know the operating status of each other so that system crash can be prevented during a power down/suspend operation.

2. Description of Related Art

FIG. 1A is a schematic diagram showing a codec system including a codec 12 and a codec controller 10 which are designed in compliance with the AC 97 standard. As shown, the signal lines between the codec controller 10 and the codec 12 are nominated as RESET#, BIT_CLK, SYNC, SDATA_IN, and SDATA_OUT; wherein the RESET#, SYNC, and SDATA_OUT signals are transferred from the codec controller 10 to the codec 12, while the BIT_CLK and SDATA_IN signals are transferred from the codec 12 to the codec controller 10.

FIG. 1B is a signal timing chart showing the waveforms and timings of the SYNC, BIT_CLK, and SDATA_OUT signals transferring between the codec controller 10 and the codec 12 shown in FIG. 1A. As shown, at the temporal point T0, the SYNC signal starts to rise from logic low state to logic high state; and during the rising of the SYNC signal, the BIT_CLK signal is switched from low-voltage logic state to high-voltage logic state. Sub-sequently, at the temporal point T1, the codec controller 10 starts to send out the valid frame F of the SDATA_OUT signal to the codec 12. This signal sequencing scheme is in compliance with the ACLINK protocol.

FIG. 2 shows a codec system including an ACLINK-compliant codec controller 20 and two codecs: an audio codec (CODEC0) 22 and a modem codec (CODEC1) 24, which are incorporated in a computer system. In accordance with the ACLINK protocol, the ACLINK-compliant codec controller 20 is interconnected with the audio codec 22 and the modem codec 24 in such a manner that the BIT_CLK signal line is driven by the audio codec 22; the SDATA_OUT signal line is shared by both the audio codec 22 and the modem codec 24; and the audio codec 22 utilizes the SDATA_IN0 signal line while the modem codec 24 utilizes the SDATA_IN1 signal line for transferring data to the ACLINK-compliant codec controller 20.

One drawback to the foregoing codec system of FIG. 2, however, is that the audio codec 22 and the modem codec 24 are incapable of knowing the operating status of each other. This drawback can easily cause the codec system to crash when the codec system is entering the Power Down/Suspend Mode. This is because that at the start of this mode, the audio codec 22 will disable the BIT CLK signal; and at this time, if the modem codec 24 is still in active operation, the disabling of the BIT_CLK signal will cause the modem codec 24 to not work, and therefore result in a crash to the overall codec system.

The foregoing problem is particularly serious in the case where the functions of audio, modem, communications, and graphics are integrated in a single chip. There exists, therefore, a need for a codec system which allows all the codecs to know the operating status of each other so that system crash can be prevented when entering the Power Down/Suspend Mode.

SUMMARY OF THE INVENTION

It is therefore an object of this invention to provide a codec system, which allows all the codecs therein to know the operating status of each other so that the codec system can be prevented from system crash when entering the Power Down/Suspend Mode.

It is another object of this invention to provide a codec system, in which the codec used to generate the clock signal will be disabled only when all the other codecs are in inactive operation.

It is still another object of this invention to provide a codec system, which can enter into the Power Down/Suspend Mode operation only when all the codecs in the codec system are in inactive operation.

In accordance with the foregoing and other objects, the invention provides a codec system with shadow buffers and a method of performing a Power Down/Suspend Mode operation on this codec system.

The codec system of the invention includes: a first codec; a second codec; a first codec controller, coupled to the first codec, for controlling the operation of the first codec; the first codec controller including a first status data buffer and a first shadow buffer; and a second codec controller, coupled to the second codec, for controlling the operation of the second codec; the second codec controller including a second status data buffer and a second shadow buffer. The first codec controller utilizes the first status data buffer for registering the operating status thereof; and the second codec controller utilizes the second status data buffer for registering the operating status thereof. Moreover, the first codec controller utilizes the first shadow buffer for storing a copy of the operating status data stored in the second status data buffer of the second codec controller; and the second codec controller utilizes the second shadow buffer for storing a copy of the operating status data stored in the first status data buffer of the first codec controller.

In the foregoing codec system, for instance, the first codec is an audio codec, while the second codec is a modem codec, and the associated codec controllers are in compliance with the ACLINK protocol. The invention allows all the codecs therein to know the operating status of each other without having to do it through the ACLINK-compliant controllers.

Further, the method of the invention for performing a Power Down/Suspend Mode operation on the foregoing codec includes the following procedural step: (1) registering the operating status of each codec controller in its status data buffer, and meanwhile making a copy of the registered status data in the shadow buffer of each of the other codec controllers; (2) during operation, setting the active bit in the status data buffer of each codec controller to a first value (for example, the binary value 1) indicative of active operation and a second value (for example, the binary value 0) indicative of inactive operation; and (3) when Power Down/Suspend Mode is requested, checking whether all the active bits are set to the second value; if YES, switching the codec system to the Power Down/Suspend Mode.

By the invention, all the codecs in the codec system are capable of knowing the operating status of each other, and the codec that is responsible for generating the BIT_CLK signal will disable the BIT_CLK signal only when it checks that all the other codecs are inactive. This feature can help prevent system crash that would otherwise occur in the case of the prior art.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

The invention provides a codec system which includes two or more codecs, and which allows all the codecs therein to know the operating status of each other without having to do it through the ACLINK protocol.

Figure 1A:
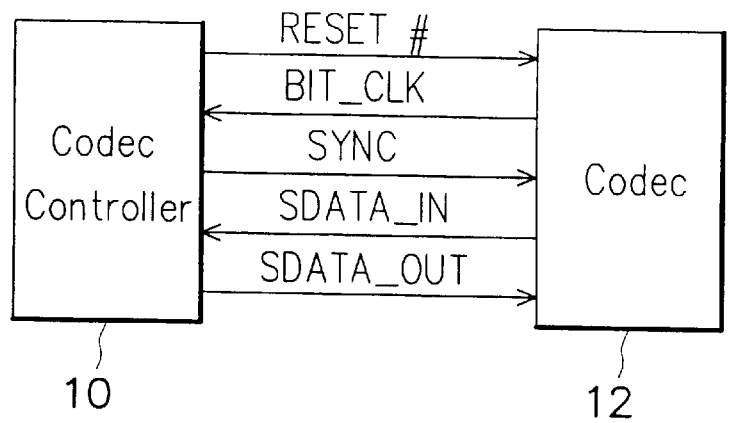
FIG. 1A (PRIOR ART) is a schematic diagram of a conventional codec system including a codec and a codec controller.
Figure 1B:
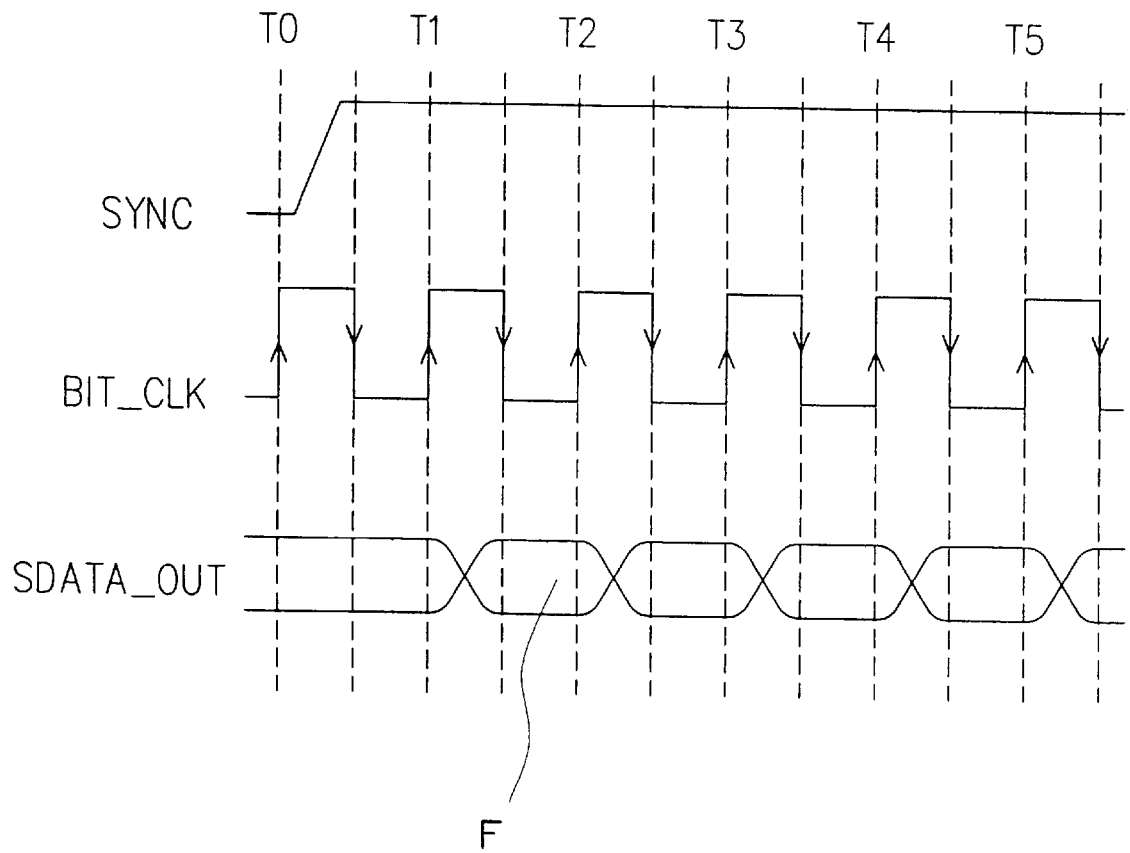
FIG. 1B (PRIOR ART) is a signal diagram showing the waveforms and timings of the signals transferring between the codec controller and the codec shown in FIG. 1.
Figure 2:
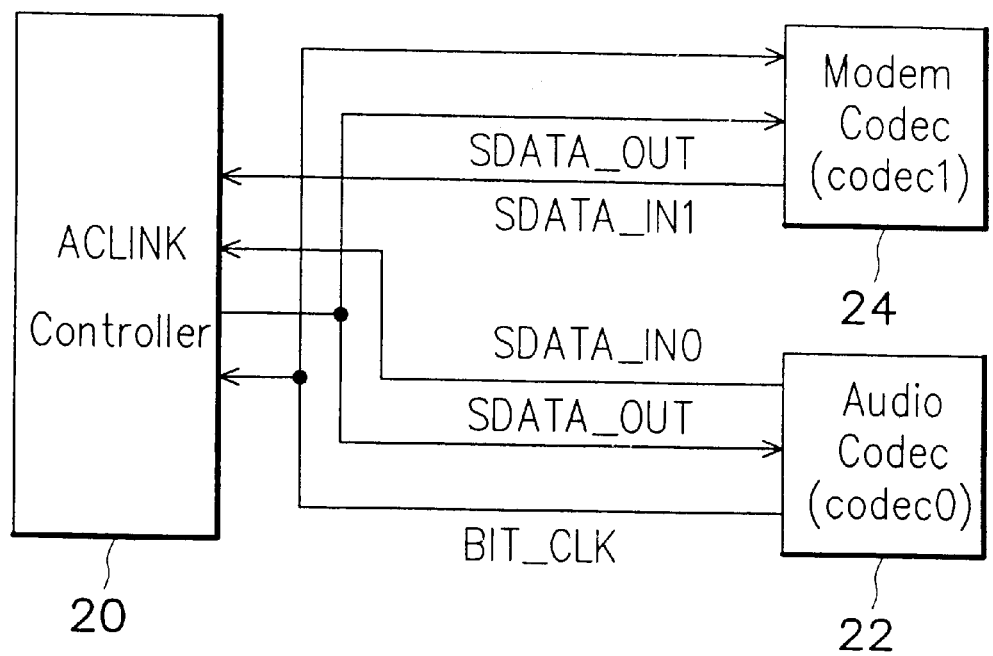
FIG. 2 (PRIOR ART) is a schematic block diagram of a conventional codec system including an ACLINK-compliant codec controller and two codecs.
Figure 4:
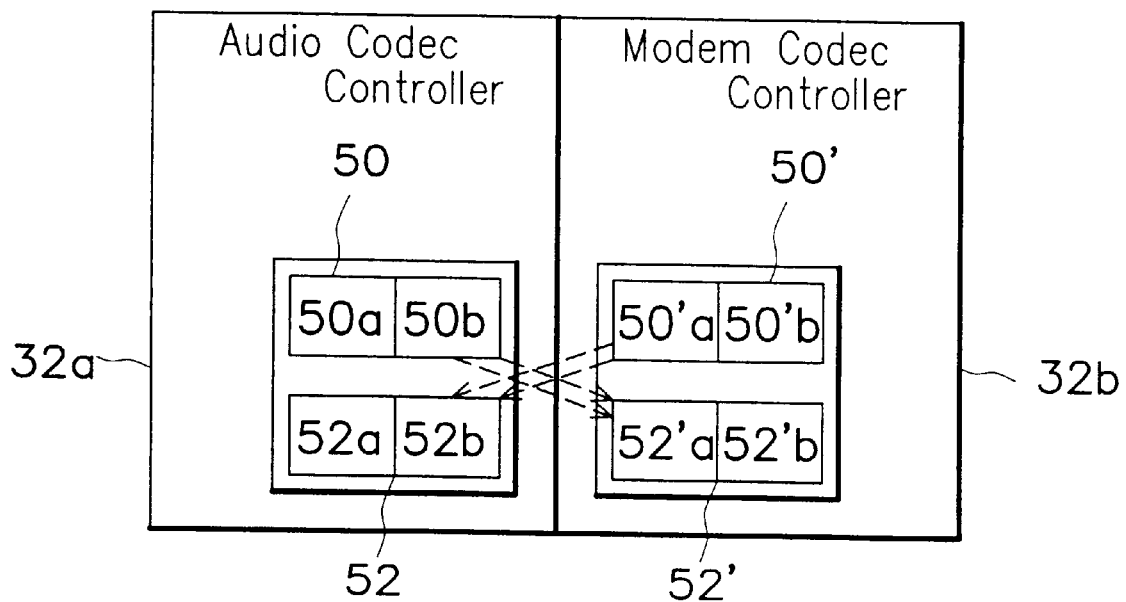
FIG. 4 is a schematic diagram showing the incorporation of a status data buffer and a shadow buffer in each of the two codecs shown in FIG. 3.
Figure 3:
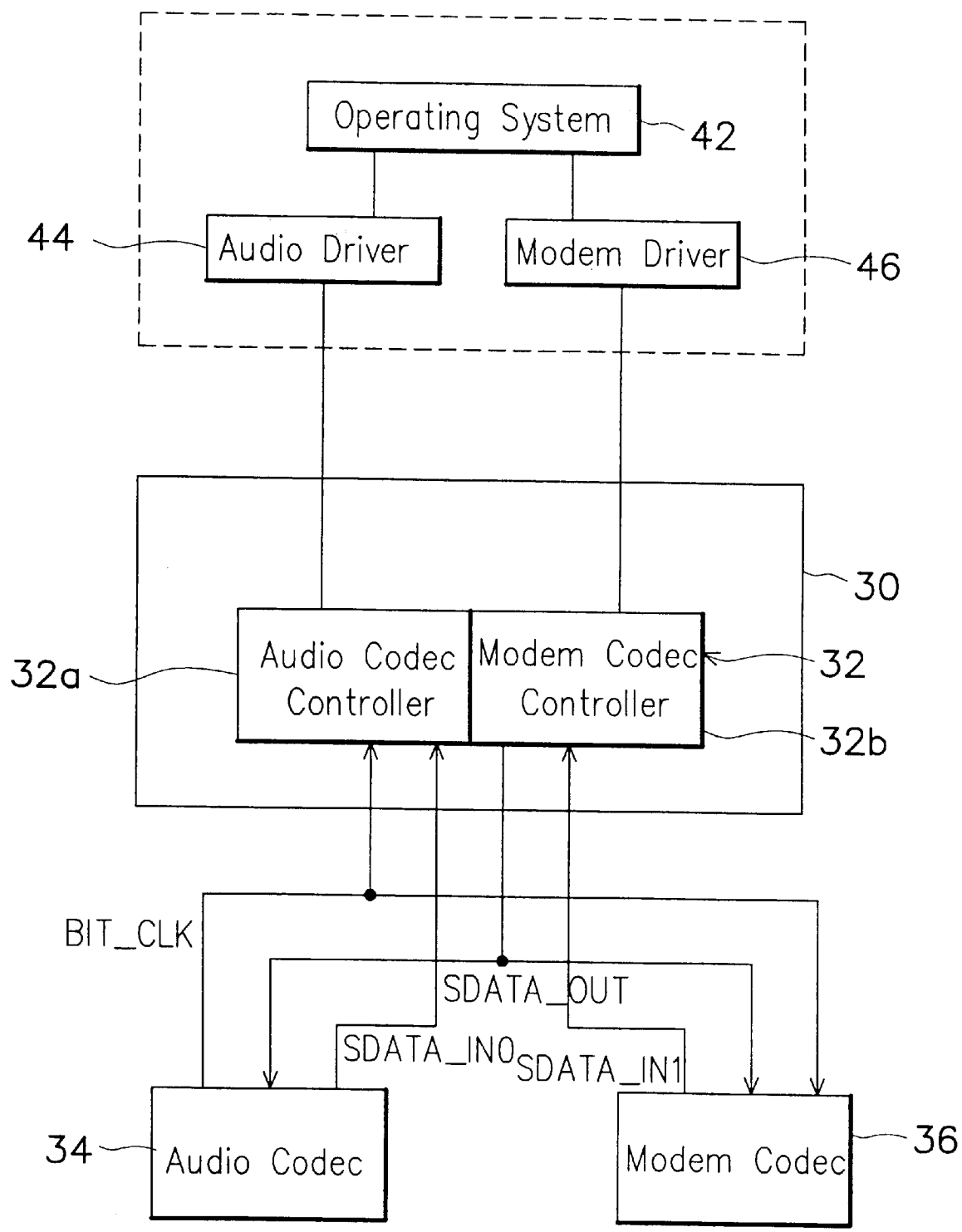
FIG. 3 is a schematic block diagram showing a codec system designed in accordance with the invention.

FIG. 3 is a schematic block diagram showing a codec system designed in accordance with the invention; and FIG. 4 is a schematic diagram showing the incorporation of a status data buffer and a shadow buffer in each of the two codecs shown in FIG. 3. In this preferred embodiment, the codec system includes two codecs; but broadly speaking, the codec system can include a plurality of codecs, and all these codecs are capable of knowing the operating status of each other.

Referring to FIG. 3, the codec system includes a single chipset 30 incorporating an ACLINK-compliant codec controller 32 having an audio codec controller 32a and a modem codec controller 32b. The audio codec controller 32a is used to control the operation of an audio codec 34, while the modem codec controller 32b is used to control the operation of a modem codec 36. The ACLINK-compliant codec controller 32 is interconnected with the audio codec 34 and the modem codec 36 via the following signal lines: BIT_CLK, SDATA_OUT, SDATA_IN0, and SDATA_IN1. The BIT_CLK signal line is driven by the audio codec 34 and is connected to both the audio codec controller 32a and the modem codec 36; the SDATA_OUT signal line is driven by the modem codec controller 32b and is connected to both the audio codec 34 and the modem codec 36; the SDATA_IN0 signal line is driven by the audio codec 34 and is connected to the audio codec controller 32a; and the SDATA_IN1 signal line is driven by the modem codec 36 and is connected to the modem codec controller 32b. These signals are compliant with the ACLINK protocol.

This codec system is incorporated in a computer system running an operating system 42. The codec system is configured in such a manner that the audio codec controller 32a is driven by an audio driver 44, while the modem codec controller 32b is driven by a modem driver 46, where the audio driver 44 and the modem driver 46 are software modules under the operating system 42.

Referring to FIG. 4, it is a characteristic feature of the invention that the audio codec controller 32a is incorporated with a pair of buffers: a first status data buffer 50 and a first shadow buffer 52; and in a similar manner, the modem codec controller 32b is incorporated with a pair of buffers: a second status data buffer 50' and a second shadow buffer 52'.

The first status data buffer 50 is used to register the operating status of the audio codec controller 32a; while the second status data buffer 50' is used to register the operating status of the modem codec controller 32b. The first shadow buffer 52 in the audio codec controller 32a serves as a shadow storage unit for the second status data buffer 50' in the modem codec controller 32b; i.e., the first shadow buffer 52 is used to store a copy of the status data stored in the second status data buffer 50'. The first shadow buffer 52 is read-only in attribute to the audio codec controller 32a. In a similar manner, the second shadow buffer 52' in the modem codec controller 32b serves as a shadow storage unit for the first status data buffer 50 in the audio codec controller 32a; i.e., the second shadow buffer 52' is used to store a copy of the status data stored in the first status data buffer 50. The second shadow buffer 52' is read-only in attribute to the modem codec controller 32b.

During operation, the audio codec controller 32a is capable of knowing the operating status of the modem codec controller 32b simply by checking the status data stored in the first shadow buffer 52 therein; and similarly, the modem codec controller 32b is capable of knowing the operating status of the audio codec controller 32a simply by checking the status data stored in the second shadow buffer 52' therein.

Further, the first status data buffer 50 can be divided into two units: a first block 50a and a second block 50b; wherein the first block 50a s used to register all the operating status data of the audio codec controller 32a, while the second block 50b is used to register the I/O base data of the audio codec controller 32a. In a similar manner, the second status data buffer 50' can be divided into two units: a first block 50a' and a second block 50b'; wherein the first block 50a' is used to register all the operating status data of the modem codec controller 32b, while the second block 50b' is used to register the I/O base data of the modem codec controller 32b.

Correspondingly, the first shadow buffer 52 is divided into a first block 52a and a second block 52b; wherein the first block 52a is used to store a copy of the data stored in the first block 50a' of the first status data buffer 50' in the modem codec controller 32b, while the second block 52b is used to store a copy of the data stored in the second block 50b' of the first status data buffer 50' in the modem codec controller 32b. In a similar manner, the second shadow buffer 52' is divided into a first block 52a' and a second block 52b'; wherein the first block 52a' is used to store a copy of the data stored in the first block 50a of the first status data buffer 50 in the audio codec controller 32a, while the second block 52b' is used to store a copy of the data stored in the second block 50b of the first status data buffer 50 in the audio codec controller 32a.

When it is requested to enter the Power Down/Suspend Mode, the audio codec 34 is capable of knowing the operating status of the modem codec 36 simply by checking the operating status data stored in the first shadow buffer 52 in the audio codec controller 32a. If the modem codec 36 is still in operation, the audio codec 34 will not disable the BIT_CLK signal, thus preventing system crash under this condition.

Figure 5:
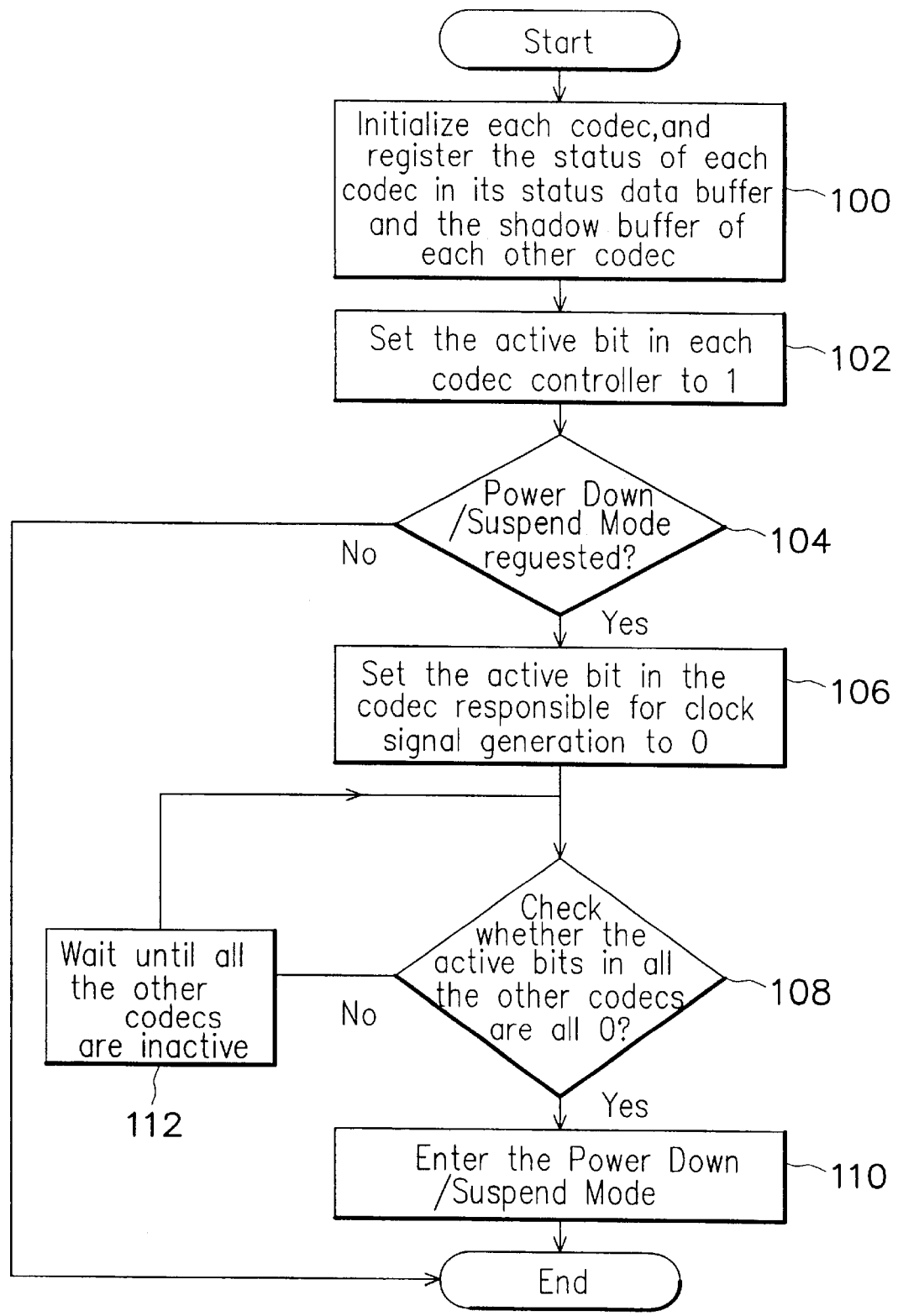
FIG. 5 is a flow diagram showing the procedural steps involved in the method of the invention for performing a Power Down/Suspend Mode operation on the codec system of FIG. 3.

FIG. 5 is a flow diagram showing the procedural steps involved in the method according to the invention for performing a Power Down/Suspend Mode operation on the codec system of the invention.

Referring to FIG. 5 together with FIGS. 3 and 4, in the first step 100, all the codec controllers in the codec system, i.e., the audio codec controller 32a and the modem codec controller 32b, are initialized. Then, during operation, the operating status of each codec is registered in its status data buffer as well as in the shadow buffer of each of the other codecs; i.e., the operating status of the audio codec controller 32a is registered in the first status data buffer 50 as well as in the second shadow buffer 52' in the modem codec controller 32b, while the operating status of the modem codec controller 32b is registered in the second status data buffer 50' as well as in the first shadow buffer 52 in the audio codec controller 32a. Each status data buffer and shadow buffer includes an active bit indicator of whether the associated codec is in active operation or inactive operation. The active bit is set in such a manner that when the active bit is set to a first binary value, for example 1, it indicates that the associated codec is still in active operation; and when set to a second binary value, for example 0, it indicates that the associated codec is idle.

In the next step 102, the system checks each codec to see if it is still in active operation; if YES, the active bit in the status data buffer and associated shadow buffer is set to 1; otherwise, the active bit is set to 0.

In the step 104, the system checks whether the Power Down/Suspend Mode is requested. If it is YES, the procedure goes to the step 106. If it is NO, the procedure goes to end.

In the step 106, the BIT_CLK signal is disabled. In the case of FIG. 3, the audio codec 34 is set to disable the BIT_CLK signal.

In the step 108, the system checks whether the active bits in the shadow buffer of other codecs are 0 or not. If NOT, it indicates that at least one of the other codecs is still in active operation, and the procedure goes to the step 112; whereas, if YES, it indicates that all of the codecs are inactive, and the procedure goes to the step 110. In the step 112, the system waits until all the other codecs stop operation. In the step 110, the system enters the Power Down/Suspend Mode. The procedure is then ended.

In conclusion, the invention is characterized in that all the codecs in the codec system are capable of knowing the operating status of each other, and the codec that is responsible for generating the BIT_CLK signal will disable the BIT_CLK signal only when it checks that all the other codecs are inactive. This feature can help prevent system crash that would otherwise occur in the case of the prior art.

Compared to the prior art, the invention has the following advantages.

First, the invention allows all the codecs in the codec system to be capable of knowing the operating status of each other, so that system crash can be prevented during power down/suspend operation.

Second, when the Power Down/Suspend Mode is requested, the codec that is responsible for generating the BIT_CLK signal will disable the BIT_CLK signal only when it checks that all the other codecs are inactive. This feature can help prevent system crash that would otherwise occur in the case of the prior art when the Power Down/Suspend Mode is requested.

Third, the invention utilizes shallow buffers to allow all the codecs in the codec system to know the operating status of each other. This feature allows the system to enter into the Power Down/Suspend Mode only when it checks that all the codecs in the codec system are inactive, thus preventing system crash that would otherwise occur in the case of the prior art.

Fourth, the invention allows the use of only one codec controller unit to support a plurality of codecs, particularly an ACLINK-compliant codec controller. This allows the integration of various functional units in a single chipset.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A codec system, which comprises:

a first codec;

a second codec;

a first codec controller, coupled to the first codec, for controlling the operation of the first codec; the first codec controller including a first status data buffer and a first shadow buffer; and a second codec controller, coupled to the second codec, for controlling the operation of the second codec; the second codec controller including a second status data buffer and a second shadow buffer;

wherein the first codec controller utilizes the first status data buffer for registering the operating status thereof; and the second codec controller utilizes the second status data buffer for registering the operating status thereof;

and wherein the first codec controller utilizes the first shadow buffer for storing a copy of the operating status data stored in the second status data buffer of the second codec controller; and the second codec controller utilizes the second shadow buffer for storing a copy of the operating status data stored in the first status data buffer of the first codec controller.

2. The codec system of claim 1, wherein the first codec is an audio codec, while the second codec is a modem codec.

3. The codec system of claim 2, wherein the first codec controller is an audio codec controller, while the second codec controller is a modem codec controller.

4. The codec system of claim 1, wherein the first and second codec controllers are in compliance with the ACLINK protocol.

5. The codec system of claim 1, wherein the first status data buffer and the first shadow buffer of the first codec controller are two separate data storage units; and the second status data buffer and the second shadow buffer of the second codec controller are two separate data storage units.

6. The codec system of claim 1, wherein the first status data buffer and the first shadow buffer of the first codec controller are implemented in two separate blocks in a first data storage unit; and the second status data buffer and the second shadow buffer of the second codec controller are implemented in two separate blocks in a second data storage unit.

7. The codec system of claim 1, wherein the first status data buffer of the first codec controller is divided into a first block and a second block; wherein the first block is used to register the operating status of the first codec controller, and the second block is used to register the I/O base of the first codec controller.

8. The codec system of claim 7, wherein the second status data buffer of the second codec controller is divided into a first block and a second block; wherein the first block is used to register the operating status of the second codec controller, and the second block is used to register the I/O base of the second codec controller.

9. A codec control device, used to control at least one codec, the codec control device comprising:
  a first codec controller including a first status data buffer and a first shadow buffer; and
  a second codec controller including a second status data buffer and a second shadow buffer;
  wherein
    the first codec controller utilizes the first status data buffer for registering the operating status thereof; and
    the second codec controller utilizes the second status data buffer for registering the operating status thereof;
  and wherein
    the first codec controller utilizes the first shadow buffer for storing a copy of the operating status data stored in the second status data buffer of the second codec controller; and
    the second codec controller utilizes the second shadow buffer for storing a copy of the operating status data stored in the first status data buffer of the first codec controller.

10. The codec control device of claim 9, wherein the first codec controller is an audio codec controller, while the second codec controller is a modem codec controller.

11. The codec control device of claim 9, wherein the first and second codec controllers are in compliance with the ACLINK protocol.

12. The codec control device of claim 9, wherein the first status data buffer and the first shadow buffer of the first codec controller are two separate data storage units; and the second status data buffer and the second shadow buffer of the second codec controller are two separate data storage units.

13. The codec control device of claim 9, wherein the first status data buffer of the first codec controller is divided into a first block and a second block; wherein the first block is used to register the operating status of the first codec controller, and the second block is used to register the I/O base of the first codec controller.

14. The codec control device of claim 9, wherein the first status data buffer of the first codec controller is divided into a first block and a second block; wherein the first block is used to register the operating status of the first codec controller, and the second block is used to register the I/O base of the first codec controller.

15. The codec control device of claim 14, wherein the second status data buffer of the second codec controller is divided into a first block and a second block; wherein the first block is used to register the operating status of the second codec controller, and the second block is used to register the I/O base of the second codec controller.

16. A codec control device used to control at least one coddec, the codec control device comprising:
  a plurality of codec controllers, each codec controller including a status data buffer and a shadow buffer, and each codec controller utilizing its status data buffer for registering the operating status thereof and its shadow buffer for storing a copy of the operating status data stored in the status data buffer of each of the other codec controllers.

17. The codec control device of claim 16, wherein the status data buffer and the shadow buffer of each of the codec controllers are two separate data storage units.

18. The codec control device of claim 16, wherein the status data buffer and the shadow buffer of each of the codec controllers are two separate blocks in a single data storage unit.

19. The codec control device of claim 16, wherein the status data buffer of each codec controller is divided into a first block and a second block; wherein the first block is used to register the operating status of the associated codec controller, and the second block is used to register the I/O base of the associated codec controller.

20. The codec control device of claim 19, wherein the shadow buffer of each codec controller is divided into a first block and a second block; wherein the first block is used to register the operating status of each of the other codec controllers, and the second block is used to register the I/O base of each of the other codec controllers.

21. A method for performing a Power Down/Suspend Mode operation on a codec system having a plurality of codec controllers, each codec controller including a status data buffer and a shadow buffer, and each codec controller utilizing its status data buffer for registering the operating status thereof and its shadow buffer for storing a copy of the operating status data stored in the status data buffer of each of the other codec controllers, each of the status data buffer and shadow buffer active bit indicative of whether the associated codec is in active operation or inactive operation;
  the method comprising the steps of:
    registering the operating status of each codec controller in its status data buffer, and making a copy of the registered status data in the shadow buffer of each of the other codec controllers;
    during operation, setting the active bit in the status data buffer of each codec controller to a first value indicative of active operation and a second value indicative of inactive operation; and
    when Power Down/Suspend Mode is requested, checking whether all the active bits are set to the second value; if YES, switching the codec system to the Power Down/Suspend Mode.

* * * * *